(12) United States Patent
Cheng

(10) Patent No.: US 6,259,171 B1
(45) Date of Patent: Jul. 10, 2001

(54) HOT-SWAP DEVICE PREVENTING SYSTEM CRASH WHEN SWITCHING POWER SOURCE

(75) Inventor: Ted Cheng, Hsinchu (TW)

(73) Assignee: Mitac International Corp., Hsinchu (TW)

( * ) Notice: Subject to any disclaimer, the term of this patent is extended or adjusted under 35 U.S.C. 154(b) by 0 days.

(21) Appl. No.: 09/491,771

(22) Filed: Jan. 26, 2000

(30) Foreign Application Priority Data

Jan. 27, 1999 (TW) ................................................ 88101206

(51) Int. Cl.⁷ ...................................................... H02J 1/00
(52) U.S. Cl. ................... 307/85; 307/44; 307/66
(58) Field of Search ................... 307/85, 64, 44, 307/66

(56) References Cited

U.S. PATENT DOCUMENTS

| | | | |
|---|---|---|---|
| 5,278,453 | * | 1/1994 | Pollmeier ................................ 307/44 |
| 5,739,596 | * | 4/1998 | Takizawa et al. ....................... 307/66 |
| 5,894,413 | * | 4/1999 | Ferguson ................................ 363/65 |
| 5,939,801 | * | 8/1999 | Bouffard et al. ........................ 307/65 |
| 6,034,508 | * | 3/2000 | Chang .................................... 320/138 |

\* cited by examiner

*Primary Examiner*—Stephen W. Jackson
*Assistant Examiner*—Sharon Polk
(74) *Attorney, Agent, or Firm*—Darby & Darby

(57) ABSTRACT

A hot-swap device preventing the crashing of a system which has two power sources when performing power swapping operation between the two power sources by continuously providing spare-power to the system during the switching period.

12 Claims, 2 Drawing Sheets

HOT-SWAP DEVICE PREVENTING SYSTEM CRASH WHEN SWITCHING POWER SOURCE

BACKGROUND OF THE INVENTION

1. Field of the Invention

The present invention relates in general to a switching device. More specifically, it relates to a hot-swap device allowing on-line switching of the power source of a system without causing the system to crash.

2. Description of the Related Art

A relay is a popular switching devices applied to perform switching operation. However, the relay can not perform a switching operation without introducing a time delay because of its mechanism and structure. Therefore, electronic systems using relays for switching operation may crash due to the switching delay of the relays. For example, using a relay to switch one battery set to the other battery set supplying power to a notebook computer could make the notebook computer crash.

FIG. 1 schematically shows a conventional swapping circuit for switching two battery sets installed in a notebook computer. Referring to FIG. 1, one of the two batter sets 12 and 14 is selected by a relay 10 to supply power to a notebook computer 16. For example, the battery set 12 first supplies power to the notebook computer 16. When the battery set 12 is going to run out of its power and users want to replace the battery set 12 with a new one without shutting down the notebook computer 16, the power supplied to the notebook computer 16 is swapped form the battery set 12 to the battery set 14 via the control of the relay 10. Then users can take out the battery set 12 and install a new one. When the relay 10 performs the switching operation, the metal rod or slice 10P (in FIG. 1) moves from the terminal A to the terminal B so that the notebook computer 16 obtains power from the battery set 14 instead of the battery set 12. However, the metal rod or slice 10P does not move from terminal A to terminal B instantly; some switching delay is inevitable. Therefore, the notebook computer 16 does not obtain steady power during the period when the metal rod or slice 10P moves from terminal A to terminal B. Accordingly, the notebook computer may crash. Moreover, the more aged the relay 10, the longer the switching delay is, and the possibility of the notebook computer crashing is increased.

SUMMARY OF THE INVENTION

Therefore, an object of the present invention is to provide a hot-swap device that prevents a system having two power sources from crashing when performing power swapping operation between the two power sources by continuously providing spare-power to the system during the switching period.

The present invention achieves the above-indicated objects by providing a hot-swap device comprising: a selection device for selecting a first power source or a second power source to feed power to the system; and a spare-power generating device for continuously feeding spare power to the system during the period when the selection device cuts the connection from the first power source to the system and before the selection device feeds the second power source to the system.

BRIEF DESCRIPTION OF THE DRAWINGS

The following detailed description, given by way of example and not intended to limit the invention solely to the embodiments described herein, will best be understood in conjunction with the accompanying drawings, in which.

DETAILED DESCRIPTION OF THE PREFERRED EMBODIMENTS

Figure 1:
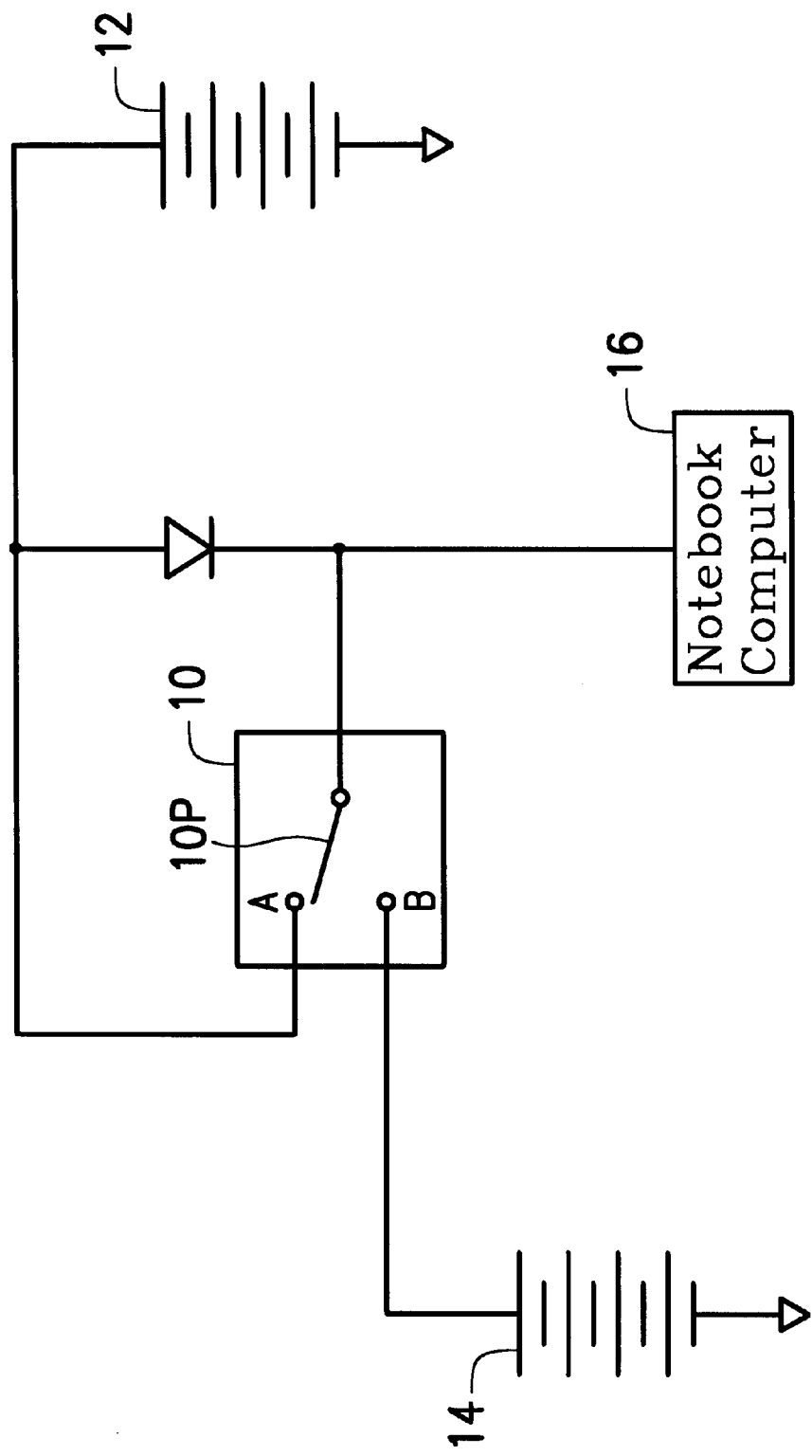
FIG. 1 schematically shows a conventional swapping circuit for switching two battery sets installed in a notebook computer.
Figure 2:
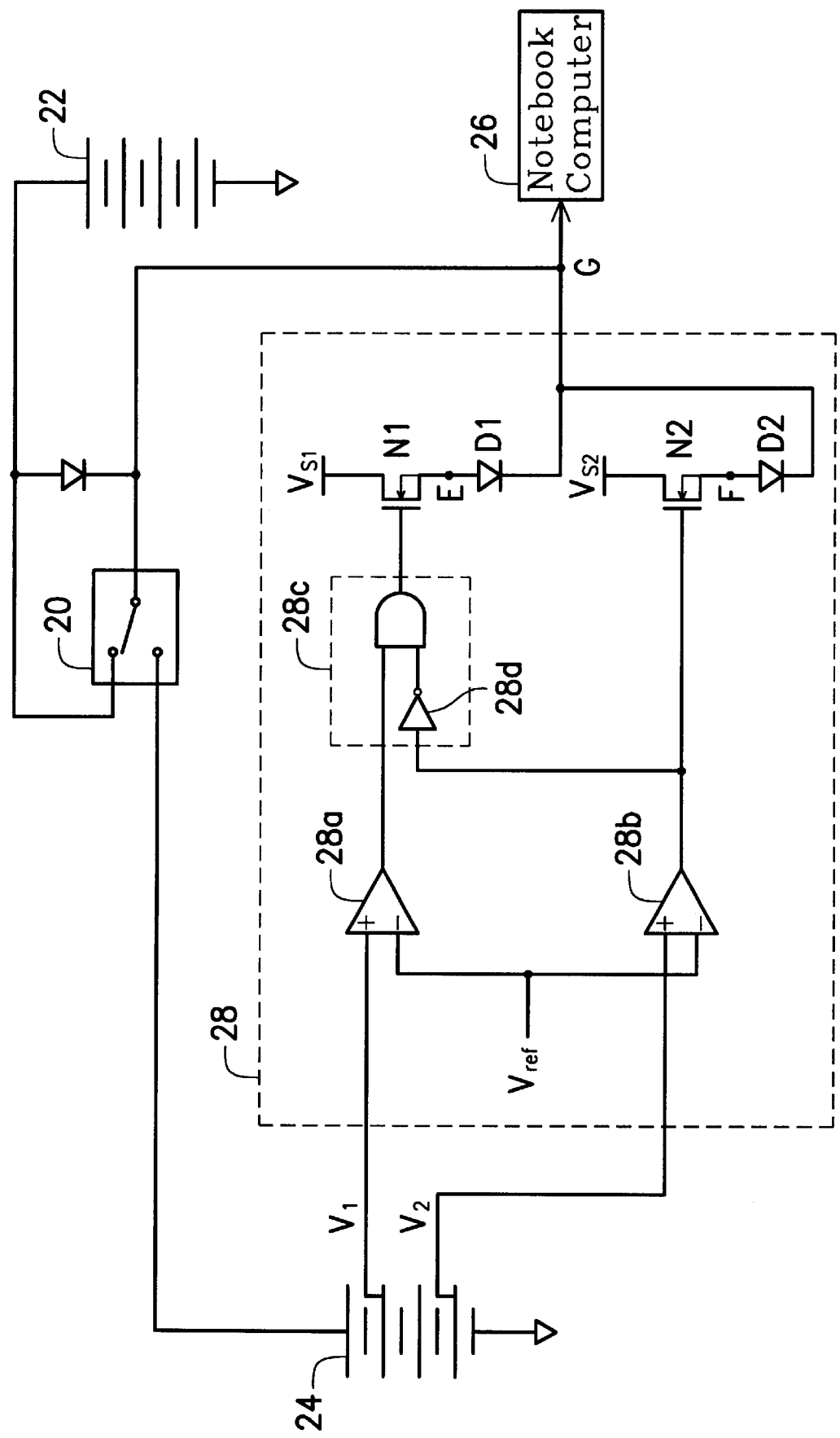
FIG. 2 schematically illustrates a circuit diagram of one embodiment of the present invention.

FIG. 2 illustrates an embodiment of a hot-swap device according to the present invention. In this embodiment, the hot-swap device is applied to switching two battery sets installed in a notebook computer system.

Referring to FIG. 2, the hot-swap device at least comprises a relay 20, and a spare-power generating device 28. The relay 20 serves as a selection device for coupling a first battery set 22 or a second battery set 24 to a notebook computer 26 according to the control of a selecting signal (not shown). The spare-power generating device 28 receives a first and second divided voltages ($V_1$ and $V_2$) of the second battery set 24, and continuously outputs a first voltage ($V_{s1}$) or a second voltage ($V_{s2}$) to the output of the relay 20 in response to the level variation of the second battery set 24. In this embodiment, the levels of the first and second voltages ($V_{s1}$ and $V_{s2}$) equal those of the first and second divided voltages ($V_1$ and $V_2$) respectively.

The spare-power generating device 28 comprises: a first comparator 28a for comparing the first divided voltage $V_1$ with a reference voltage $V_{ref}$; a second comparator 28b for comparing the second divided voltage $V_2$ with the reference voltage $V_{ref}$; a MOS transistor N1 serving as a first switch with its input (drain) coupling to the first voltage ($V_{s1}$); a MOS transistor N2 serving as a second switch with its input (drain) coupling to the second voltage ($V_{s2}$); and a logic-control device 28c, receiving the outputs of the first and second comparators (28a, 28b).

The reference voltage ($V_{ref}$) is set to the minimal voltage required by the notebook computer 26 for normal operation. In this embodiment, the logic-control device 28c is an AND gate with one input connecting to a NOT gate 28d; the diodes D1 and D2 connecting to the MOS transistors (N1, N2) are used as isolation devices.

When the second divided voltage $V_2$ is greater than the reference voltage $V_{ref}$, the second comparator 28b outputs a signal with high logic level "H", thereby turning on the MOS transistor N2. Therefore, the second voltage $V_{s2}$, appears at terminal F.

When the second divided voltage $V_2$ is less than the reference voltage $V_{ref}$ and the first divided voltage $V_1$ is greater than the reference voltage $V_{ref}$, the second comparator 28b outputs a signal with low logic level "L" and the first comparator 28a outputs a signal with high logic level "H"; and the logic-control device 28c outputs a signal with high logic level "H", thereby turning on the MOS transistor N1. Consequently, the first voltage $V_{s1}$ appears at terminal E.

In this embodiment, the first battery set 22 comprises 9 battery units connected in series, and the voltage specification of the first battery set 22 is about 10.8 V. The second battery set 24 comprises 14 battery units connected in series, and the voltage specification of the second battery set 22 is about 16.8 V. The reference voltage $V_{ref}$ is set to be less than 8.4 V. Furthermore, the voltage level of the second divided voltage $V_2$ equals those of 7 battery units connected in serial in the second battery set 24; and the voltage level of the first divided voltage $V_1$ equals that of 8 battery units connected in serial in the second battery set 24.

If the second battery set 24 has sufficient power capacity (the voltage level of the second battery set 24 equals to 16.8 V), then the second divided voltage $V_2$ (8.4 V) is greater than the reference voltage $V_{ref}$. Therefore, the second comparator 28b outputs a signal with high logic level "H", and makes the MOS transistor N2 turn on. Therefore, the second voltage $V_{s2}$ appears at terminal F.

When the relay 20 switches the power source supplied to the notebook computer 26 from the first battery set 22 to the second battery set 24, terminal G is in a floating state, and the voltage at terminal G will be less than the minimal voltage required by the notebook computer 26 for normal operation during the switching period (or delay). During the switching period (or delay), the second voltage $V_{s2}$ at terminal F will appear at the terminal G through the diode D2, thereby providing the second voltage ($V_{s2}$=8.4 V) to the notebook computer 26. When the second battery set 24 (with voltage level 16.8 V) is fed to the notebook computer 26 through the relay 20, the diode D2 is turned off and isolates the terminals F and G.

Consequently, because the notebook computer 26 is always coupled to the second voltage $V_{s2}$ during the switching delay of the relay 20, users can switch the power source supplied to the notebook computer 26 from the first battery set 22 to the second battery set 24 without shutting down the notebook computer and without crashing the notebook computer 26.

Once the second battery set 24 does not have sufficient power capacity (the voltage level of the second battery set 24 is less than 16.8 V), the second divided voltage $V_2$ is less than the reference voltage (and 8.4 V), while the voltage level of the first divided voltage $V_1$ is less than 9.6 V but still greater than the reference voltage (and 8.4 V). Under this condition, the second comparator 28b outputs a signal with low logic level "L" and the first comparator 28a outputs a signal with high logic level "H"; the logic-control device 28c outputs a signal with high logic level "H", thereby turning on the MOS transistor N1. Consequently, the first voltage $V_{s1}$, appears at terminal E.

Similarly, when the relay 20 switches the power source supplied to the notebook computer 26 from the first battery set 22 to the second battery set 24, terminal G is in a floating state, and the voltage at terminal G will be less than the minimal voltage required by the notebook computer 26 for normal operation during the switching period (or delay). During the switching period (or delay), the first voltage $V_{s1}$ at terminal E will appears at the terminal G through the diode D1, thereby providing the first voltage (9.6V>$V_{s1}$>8.4V) to the notebook computer 26. When the second battery set 24 is fed to the notebook computer 26 through the relay 20, the diode D1 is turned off and isolates the terminals E and G.

Consequently, because the notebook computer 26 is always coupled to the first voltage $V_{s1}$ during the switching delay of the relay 20, users can switch the power source supplied to the notebook computer 26 from the first battery set 22 to the second battery set 24 without shutting down the notebook computer and without introducing any crash to the notebook computer 26.

In addition, when the relay 20 switches the power source supplied to the notebook computer 26 from the second battery set 24 to the first battery set 22, the notebook computer 26 will not crash because the notebook computer 26 is always coupled to the first voltage $V_{s1}$ or the second voltage $V_{s2}$ during the switching delay of the relay 20.

The hot-swap device described of the present invention overcomes the switching delay problems of a relay. However, the application of the hot-swap device is not limited to this. The present invention can be applied to any kind of power switching device subject to switch delay problems to prevent a system crash.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A hot-swap device preventing the crashing of a system having two power sources when performing power swapping operation between the two power sources, comprising:

a selection device for selecting a first power source or a second power source to feed power to the system; and a spare-power generating device for continuously feeding spare power to the system during the period when said selection device cuts the connection from the first power source to the system and before said selection device feeds the second power source to the system;

wherein said spare-power generating device receives a first divided voltage and a second divided voltage taken from said second power source, outputs a second spare voltage to the system when said second divided voltage is greater than a reference voltage, and outputs a first spare voltage to the system when said second divided voltage is less than said reference voltage.

2. The hot-swap device as claimed in claim 1, wherein said spare-power device comprises:

a first comparator for comparing said first divided voltage and said reference voltage;

a second comparator for comparing said second divided voltage and said reference voltage;

a first switch whose input terminal is coupled to said first spare voltage;

a second switch whose input terminal is coupled to said second spare voltage;

a logic-control device with two inputs coupled to the outputs of said first and second divided voltages;

wherein said second switch is turned on by said second comparator to output said second spare voltage to said system when said second divided voltage is greater than said reference voltage; and said first switch is turned on by said logic-control device to output said first spare voltage to said system when said first divided voltage is greater than said reference voltage and said second divided voltage is less than said reference voltage.

3. The hot-swap device as claimed in claim 2, wherein said spare-power device further comprises: a first isolation device provided between said first switch and said system; and a second isolation device provided between said second switch and said system.

4. The hot-swap device as claimed in claim 3, wherein said first and second isolation devices are diodes whose anodes are coupled to said first and second switches respectively, and cathodes are coupled to said system.

5. The hot-swap device as claimed in claim 1, said first and second power sources are battery sets.

6. The hot-swap device as claimed in claim 1, wherein said selection device is a relay.

7. A method for a hot-swap device preventing the crashing of a system having two power sources when performing power swapping operation between the two power sources, comprising the steps of:

selecting a first power source or a second power source to feed power to the system;

continuously feeding spare power to the system during a period when connection from the first power source to the system is cut and before the second power source is fed to the system;

receiving a first divided voltage and a second divided voltage taken from said second power source;

outputting a second spare voltage to the system when said second divided voltage is greater than a reference voltage; and outputting a first spare voltage to the system when said second divided voltage is less than said reference voltage.

8. The method of claim 7 further comprising the steps of:

comparing said first divided voltage and said reference voltage;

comparing said second divided voltage and said reference voltage;

coupling an input terminal of a first switch to said first spare voltage;

coupling an input terminal of a second switch to said second spare voltage;

coupling two inputs of a logic-control device to outputs of said first and second divided voltages;

wherein said second switch is turned on to output said second spare voltage to said system when said second divided voltage is greater than said reference voltage; and said first switch is turned on to output said first spare voltage to said system when said first divided voltage is greater than said reference voltage and said second divided voltage is less than said reference voltage.

9. The method of claim 8 further comprising the steps of:

providing a first isolation device between said first switch and said system; and providing a second isolation device between said second switch and said system.

10. The method of claim 9 further comprising the steps of:

respectively coupling anodes of said first and second isolation devices to said first and second switches; and coupling cathodes of said first and second isolation devices to said system;

wherein the first and second isolation devices are diodes.

11. The method of claim 7 wherein said first and second power sources are battery sets.

12. The method of claim 7 wherein the selecting step is performed by a relay.

* * * * *

UNITED STATES PATENT AND TRADEMARK OFFICE
CERTIFICATE OF CORRECTION

PATENT NO. : 6,259,171 B1
DATED : July 10, 2001
INVENTOR(S) : Ted Cheng

It is certified that error appears in the above-identified patent and that said Letters Patent is hereby corrected as shown below:

Title page,
Item [75], Inventor, change "HSINCHU (TW)" to -- HSINCHU CITY (TW) --.

Signed and Sealed this

Eleventh Day of December, 2001

Attest:

*Nicholas P. Godici*

NICHOLAS P. GODICI
*Attesting Officer*     *Acting Director of the United States Patent and Trademark Office*